United States Patent Office 3,794,626

Patented Feb. 26, 1974

3,794,626
RADIATION SENSITIVE POLYMERS

Henri Ulrich, Northford, Fred A. Stuber, North Haven, and Allen J. Broggi, Branford, Conn., assignors to The Upjohn Company, Kalamazoo, Mich.

No Drawing. Filed Dec. 15, 1972, Ser. No. 315,302
Int. Cl. C08f *27/08;* C08g *33/00*
U.S. Cl. 260—78.5 T 6 Claims

ABSTRACT OF THE DISCLOSURE

Hydrophobic radiation-sensitive polymers are provided which are characterized by the recurring unit:

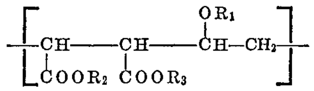

wherein $R_1$=straight chain alkyl ($C_{10-20}$), one of $R_2$ and $R_3$ is hydrogen and the other is

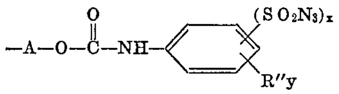

wherein A=alkylene ($C_{2-20}$), R″=lower alkyl or halogen, $x=1$ or 2, $y=0$, 1 or 2, $x+y\leq 3$. Salts of the above compounds are disclosed as well as modifications of the above polymers in which some recurring units contain tertiary amino groups.

The polymers are useful in the preparation of photoresists having high resistance to attack by acid etchants. The polymers are also useful in production of lithographic plates and the like which are to be used with oleophilic inks.

BACKGROUND OF THE INVENTION

(1) Field of the invention

This invention relates to novel radiation-sensitive polymers and is more particularly concerned with hydrophobic radiation-sensitive polymers having free carboxy and azidosulfonylcarbanilylalkoxycarbonyl moieties in the recurring unit thereof and with salts thereof, and with the use of said polymers to produce photoresists, lithographic plates, and the like.

(2) Description of prior art

Radiation-sensitive polymers in which the activatable group is sulfonazido are known in the art. A number of such polymers, and processes for chemically bonding said polymers to a variety of substrates, are described in for example, U.S. 3,467,518 and 3,462,268. More recently there have been described a series of polymers in which the recurring unit contains (i) a sulfonazido grouping linked via an ester group to the polymer chain and (ii) a free carboxylic acid group; see copending U.S. application Ser. No. 93,446 filed Nov. 27, 1970. Such polymers are useful for the preparation of photoresists, for modifying surfaces of materials to make them hydrophilic, and for the preparation of images for lithographic and like purposes, which will accept, and chemically bond, basic dyestuffs.

The polymers of the present invention differ from those described in the aforesaid application Ser. No. 93,446, in that they are hydrophobic. This confers a number of advantages on the polymers of the invention. Thus, as will be discussed in more detail hereafter, the polymers of the invention are markedly more resistant to attack by acid etchants and thereby possess advantages as photoresist materials for microcircuitry and like applications. In addition, the hydrophobic nature of lithographic plates and the like prepared from the polymers of the invention makes them receptive to use of oleophilic inks, which latter could not be used with the hydrophilic polymers of the aforesaid copending application. Other advantages of the polymers of the invention will become apparent from the following description and discussion of the invention.

SUMMARY OF THE INVENTION

The present invention comprises a hydrophobic radiation-sensitive polymer characterized by the recurring unit:

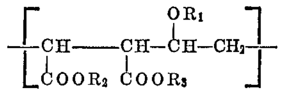

(I)

wherein $R_1$ is straight chain alkyl from 10 to 20 carbon atoms, inclusive, and wherein one of $R_2$ and $R_3$ represents hydrogen and the other of $R_2$ and $R_3$ represents a group having the formula:

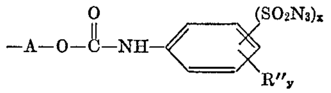

wherein A is alkylene having from 2 to 20 carbon atoms, inclusive, R″ is selected from the class consisting of lower-alkyl and halogen, $x$ is an integer from 1 to 2, $y$ is an integer from 0 to 2, provided that $x+y$ is not greater than 3, and the $SO_2N_3$ group is in any of positions 3, 4 and 5 in the phenyl nucleus to which it is attached, and at least one of the said positions 3, 4 and 5 is unsubstituted.

The invention also comprises hydrophobic radiation-sensitive polymers which contain, in addition to the above recurring unit (I), a second recurring unit having the formula:

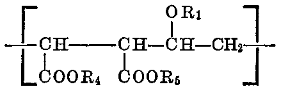

(II)

wherein $R_1$ is as defined above, one of $R_4$ and $R_5$ represents hydrogen and the other represents di(lower-alkyl) aminohydrocarbyl. Such polymers are capable of chemically bonding acid dyestuffs to non-dye receptive substrates (e.g. polyethylene).

The polymers of the invention can also exist in the form of salts such as the acid addition salts [in the case of those polymers containing the recurring unit (II)] and the salts formed by the free carboxylic acid groups in the recurring units (I) and (II) with salt-forming moieties such as alkali metals, alkaline earth metals, ammonia and tertiary amines.

The present invention also comprises processes for employing the radiation-sensitive polymers defined above to form photoresists, lithographic plates and the like which are hydrophobic, as well as to bond direct, acid and basic dyestuffs chemically to surfaces which are normally not receptive to such dyestuffs.

The term "alkylene having 2 to 20 carbon atoms, inclusive," means a divalent aliphatic hydrocarbon radical having the stated carbon atom content. Illustrative of such radicals are ethylene, 1,2-propylene, 1,3-propylene, 1,4-butylene, 1,2-pentylene, 1,3-hexylene, 2,2-dimethyl-1,3-propylene, 3-methyl-1,2-pentylene, 2-ethyl-1,2-octylene, 1,10-decylene, 1,11-undecylene, 1,15-pentadecylene, 1,18-octadecylene, 1,20-eicosylene, and the like.

The term "straight chain alkyl from 10 to 20 carbon atoms, inclusive" means the radical represented by the formula $—(CH_2)_nCH_3$ where $n$ is an integer from 9 to 19, and is inclusive of decyl, undecyl, dodecyl, tridecyl, tetradecyl, pentadecyl, hexadecyl, heptadecyl, octadecyl, nonadecyl, and eicosanyl.

The term "lower-alkyl" means alkyl from 1 to 6 carbon atoms, inclusive, such as methyl, ethyl, propyl, butyl, pentyl, hexyl, and isomeric forms thereof.

The term "halogen" is employed in its usually accepted sense as being inclusive of fluorine, chlorine, bromine, and iodine.

The term "di(lower-alkyl)aminohydrocarbyl wherein hydrocarbyl contains from 1 to 12 carbon atoms, inclusive," means a group of the formula:

$$—Q—N(\text{lower-alkyl})_2$$

wherein "lower-alkyl" is as above defined and Q represents the residue of a hydrocarbon having from 1 to 12 carbon atoms, inclusive, from which two hydrogen atoms have been removed. Illustrative of such groups are di(lower-alkyl)aminoalkyl such as dimethylaminomethyl, 2-dimethylaminoethyl, 3 - dimethylaminopropyl, 2 - diethylaminohexyl, 3-dipropylaminoethyl, 2-N-methyl-N-butylaminoethyl and the like; di(lower-alkyl)aminoaryl such as 3 - dimethylaminophenyl, 4 - dimethylaminophenyl, 4-dimethylamino - 3 - methylphenyl, 4 - dimethylamino-2,6-xylyl, 4 - (4 - dimethylaminophenyl)phenyl, 4-diisopropylaminophenyl, 2 - dimethylaminonaphthyl, and the like; di(lower-alkyl)aminoalkaryl such as 4-(dimethylaminomethyl)phenyl, 4-(diethylaminoethyl)phenyl, 4 - (2 - diethylaminopropyl)phenyl, 3 - (4 - N-methyl-N-pentylaminobutyl)phenyl, 3 - methyl - 4 - (5-dimethylaminophenyl)phenyl, 3,5 - dimethyl - 4 - (1 - dimethylaminohexyl)phenyl, 2 - dimethylaminomethylnaphthyl and the like; di(lower-alkyl)aminoaralkyl such as 4-dimethylaminophenethyl, 2 - (4 - diethylaminophenyl)propyl, 2-(4 - N-methyl-N-butylaminophenyl)hexyl, 1-(2-dimethylaminonaphthyl)methyl, 2 - (4 - dimethylaminonaphthyl) ethyl and the like; di(lower-alkyl)aminocycloalkyl such as 2 - dimethylaminocyclohexyl, 3 - diethylaminocyclohexyl, 2 - dibutylaminocyclopentyl, 2 - dipropylaminocycloheptyl, 3 - (N-methyl-N-hexylamino)cyclooctyl, and the like.

The term "radiation-sensitive" is used herein to indicate that the polymers of the invention can be activated and undergo molecular modification on exposure to thermal and/or actinic radiation.

DETAILED DESCRIPTION OF THE INVENTION

The novel radiation-sensitive polymers of the invention having the recurring unit (I) are prepared conveniently from the appropriate copolymer of maleic anhydride and the appropriate alkyl vinyl ether of the formula $CH_2{=}CH—O—R_1$ wherein $R_1$ has the significance hereinbefore defined. The latter copolymers are well known in the art (see Encyclopedia of Chemical Technology edited Kirk-Othmer, Vol. 11, p. 652, 1953) and are characterized by a recurring unit having the following formula:

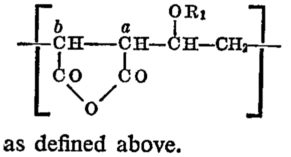

(III)

wherein $R_1$ is as defined above.

In preparing the radiation-sensitive polymers of the invention the copolymer having the recurring unit (III) is reacted with the appropriate alcohol having the formula:

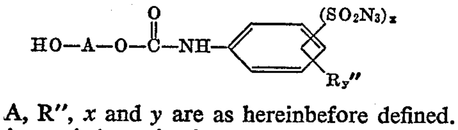

(IV)

wherein A, R″, $x$ and $y$ are as hereinbefore defined. The reaction is carried out in the presence of a tertiary base and, advantageously, in the presence of an inert organic solvent. Examples of tertiary bases which can be used and which are generally present in the reaction mixture in an amount corresponding to at least 10 percent by weight of copolymer (III), are pyridine, N,N-dimethylaniline, triethylamine, N-methylmorpholine, N-methylpiperidine, and the like. Pyridine is the preferred tertiary base and can, if desired, be used in sufficient amounts to act as solvent as well as catalyst for the reaction. Indeed, in a most preferred embodiment of the invention, the reaction is carried out with both reactants in solution in pyridine.

However, in place of the excess pyridine as solvent, there may be used an inert organic solvent, i.e. an organic solvent which does not enter into reaction with either reactant or interfere in any way with the desired course of the reaction. Examples of inert organic solvents are acetonitrile, methyl ethyl ketone, cyclohexanone, tetrahydrofuran, dioxane, and the like.

The reaction is advantageously carried out at ambient temperatures i.e. of the order of about 20° C., but elevated temperatures up to about 100° C. can be employed, if desired or necessary to achieve increased rate of reaction. The course of the reaction can be followed by routine procedures, for example, by infrared spectroscopic examination of aliquots.

The relative molar proportions in which the reactants, namely, the copolymer of recurring unit (III) and the alcohol (IV), are employed determines the nature of the product. Thus, by using one molar proportion of alcohol (IV) for each anhydride moiety (III) present in the starting copolymer there is obtained a product in which each of the original recurring units (III) present in the starting copolymer has been converted to units of the Formula I. By using less than one molar proportion of alcohol (IV) for each anhydride moiety (III) present in the starting copolymer, there is obtained a product in which some, but not all, of the original recurring units (III) present in the starting copolymer have been converted to units of Formula I. The proportion of units (I) to units of Formula III in the products in question will be directly proportional to the molar proportion of alcohol (IV) employed in the above reaction.

Further, by reacting the initial copolymer having units (III) with less than 1 molar proportion of alcohol (IV) per anhydride group in said copolymer, and reacting the product so obtained with a second, but different, alcohol of Formula IV, there can be obtained a polymer in which there are different $R_2$ and $R_3$ groups in the recurring units (I). Similarly, by employing a plurality of alcohols (IV) in a reaction sequence of the above nature, there can be obtained a polymer in which a plurality of different $R_2$ and $R_3$ groups appear in the units (I).

When the reaction of the copolymer (III) and the alcohol (IV) (or plurality of such alcohols) is adjudged complete, the polymer of recurring unit (I) is isolated from the reaction product by procedures conventional in the art. For example, after removal of the base, the inert organic solvent can be removed by distillation or, alternatively, a solvent in which the desired product is insoluble can be added to the reaction mixture. The desired product is then either left as a residue of the distillation or is precipitated from solution and isolated by filtration, decantation, or like means. Purification can be effected by routine procedures such as solvent extraction, reprecipitation, chromatography and the like.

The reaction of the alcohol (IV) with the polymer of recurring unit (III) results in opening of the anhydride ring in a proportion of, or in the whole of, the units of Formula III. The ring opening gives rise to one free carboxyl group and one esterified carboxyl group on adjacent carbon atoms designated $a$ and $b$ in Formula III. It will be apparent to one skilled in the art that two possible structures can exist. In one structure the free carboxyl group is attached to the carbon atom designated $a$ and the esterified carboxyl group is attached to the carbon atom designated $b$. In the other possible structure the position of the free carboxyl group and the esterified carboxyl group are reversed. It will be further apparent to one skilled in the art that the radiation-sensitive polymer of the invention, which is obtained by the above reaction, will contain some recurring units having the one structure and other recurring units having the other structure. It is therefore to be understood that the General Formula I shown herein as characterizing the radiation-sensitive polymers of the invention, is intended to embrace and represent all the possible structures within the polymer chain discussed above.

The radiation-sensitive polymers of the invention which contain a recurring unit of the Formula II above in addition to the recurring unit of Formula I are prepared by methods analogous to those described above for the preparation of the polymers containing only recurring unit (I). Thus the starting copolymer having the recurring unit of Formula III is reacted, either sequentially or simultaneously, with the alcohol (IV) and an appropriate alcohol of the formula:

$$HO—Q—N(lower\text{-}alkyl)_2 \qquad (V)$$

wherein Q and lower-alkyl are as hereinbefore defined. The alcohols are used in proportions such that the total number of moles of both alcohols does not exceed the number of available anhydride moieties in the starting copolymer (III). The reaction between the alcohols (sequentially or simultaneously) and the copolymer (III) is carried out under the conditions described above for the reaction between the copolymer (III) and the alcohol (IV) alone, and the method of isolation and purification is also the same.

The relative proportions in which the alcohols (IV) and (V) are used, either sequentially or simultaneously, in the above reaction will determine the relative proportions in which the recurring units (I) and (II) are present in the resulting radiation-sensitive polymers of the invention. Thus the molar proportions in which the alcohols (IV) and (V) are used relative to each other can vary from about 9:1 to 1:9; and the ratio of recurring units (I) and (II) in the resulting polymer will vary in the same range.

Further, if the total molar proportion of the alcohols (IV) and (V) employed is substantially equal to the molar proportion of starting copolymer (III) then all the anhydride groups originally present in the latter will be involved in reaction with the alcohols (IV) and (V) to form recurring units (I) and (II) respectively. Under these circumstances there will be no remaining anhydride moieties in the resulting polymer. Where the total molar proportion of alcohols (IV) and (V) is less than the molar proportion of starting copolymer (III), the resulting polymer will contain unreacted anhydride moieties, i.e. will contain recurring units of the Formula III in addition to units of the Formulae I and II. The ratio of total molar proportion of the alcohols (IV) and (V) to molar proportion of starting copolymer (III) can vary from about 0.2:1 to 1:1. The same range of proportions holds when the alcohol (IV) is employed alone to make the polymers of the invention which contain the recurring unit (I) but not recurring unit (II).

Whether the alcohols (IV) and (V) are reacted simultaneously or sequentially with the copolymer (III) the resulting polymer will have a substantially random distribution of recurring units (I) and (II) in the chain thereof. Where the total molar proportion of the alcohols (IV) and (V) is less than that required to react with all the anhydride groups in the starting copolymer (III) there will be a random distribution of the recurring units (III) of the starting copolymer in the final product in addition to the recurring units (I) and (II).

It will be apparent that reaction of the alcohol (V) with the anhydride moiety in the copolymer (III) can give rise to two possible structures depending on whether the esterified carboxyl group is attached to carbon atom *a* or *b*; see previous discussion in regard to ring opening by reaction of the alcohol (IV) with the anhydride moiety of the copolymer (III). The formula (II) shown for the resulting recurring unit derived by ring opening of the anhydride ring in the copolymer (III) is intended to embrace and represent both possible structures for this unit.

By virtue of the free carboxyl group in the recurring unit (I), and in the recurring unit (II) when the latter is present, the radiation-sensitive polymers of the invention can be converted to the corresponding carboxylic acid salts by reaction with the appropriate base using conventional procedures. As will be obvious to one skilled in the art, it is possible to convert only one, or several, or all, of the plurality of free carboxyl groups in the chain of the polymer of the invention to the corresponding salts.

Illustratively, the radiation-sensitive polymers of the invention can be converted to their alkali metal, alkaline earth metal, ammonium and organic amine salts. "Alkali metal" is inclusive of sodium, potassium, lithium, rubidium, caesium, and the like. "Alkaline earth metal" is inclusive of calcium, barium, strontium, magnesium and the like. "Organic amine" is inclusive of monaalkylamines such as methylamine, ethylamine, isopropylamine, sec-butylamine, amylamine, hexylamine, isohexylamine, octylamine, and the like; dialkylamines such as dimethylamine, N-ethyl-N-methylamine, N - methyl - N - propylamine, N-methyl-N-isobutylamine, diisopropylamine, N-ethyl-N-hexylamine, N-methyl-N-isooctylamine and the like; trialkylamines such as triethylamine, trimethylamine, N,N-dimethylpropylamine, N,N-dimethylhexylamine, N,N-diethylisobutylamine and the like; monoalkenylamines such as allylamine, 2-butenylamine, 3-hexenylamine, octenylamine and the like; dialkenylamines such as diallylamine, di-2-butenylamine, di-3-hexenylamine and the like; cycloalkylamines such as cyclopropylamine, cyclobutylamine, cyclopentylamine, cyclohexylamine and the like; N-alkylcycloalkylamines such as N-methylcyclopentylamine, N-ethylcyclopentylamine, N-propylcyclohexylamine and the like; cycloalkenylamines such as cyclopentenylamine, cyclohexenylamine and the like; aralkylamines such as benzylamine, phenethylamine, phenylpropylenamine, benzyhydrylamine and the like; N-alkyl-N-aralkylamines such as N-methylbenzylamine, N-propylbenzylamine, N-isobutylbenzylamine, N-octylbenzylamine, N-methylphenethylamine and the like; N,N-disubstituted aralkylamines such as N,N-dimethylbenzylamine, N-methylbenzhydrylamine, N,N-diethyl-3-phenylpropylamine, N-butyl-2-phenethylamine and the like; N-alkyl-arylamines such as N-methylaniline, N-isopropyl-aniline, N-hexylamine, N-methyl-p-toluidine, N-ethyl-m-xylidine, N-methylnaphthylamine, N-methylbenzidine, N,N′-dimethylbenzidine, and the like; N,N-dialkylarylamines such as N,N′-dimethylaniline, N,N-dibutylaniline, N-hexyl-N-methylaniline, N,N-dimethyltoluidine and the like; N-aralkyl-arylamines such as N-benzylaniline, N-phenethylaniline, N-benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methylpyrrolidine, N-ethylpiperidine, N-methyl-N′-hexylpiperazine, N-methylmorpholine and the like.

The above salts of the radiation-sensitive polymers of the invention can be prepared readily from the free carboxylic acid polymers of the invention by any of the methods conventionally used in the art for preparing carboxylic acid salts of this type. Illustratively, the free carboxylic acid polymer is dissolved in a water-miscible solvent such as acetone and treated with the appropriate amount of base to neutralize some or all of the free carboxyl groups in the polymer. In the preparation of the alkali metal, alkaline earth metal, or ammonium salts, the base is advantageously in the form of an aqueous solution of the corresponding hydroxide or carbonate or an alcohol solution of the corresponding alkoxide. In the case of the amine salts, the free amine is used as the base, advantageously as a solution in a water-miscible solvent. The resulting salt generally separates from solution. Alternatively, the salt can be isolated by partial or complete evaporation of the solution or by addition of an appropriate salt in which the salt is insoluble.

It will be readily appreciated by one skilled in the art that part of the free carboxylic acid groups in the polymers of the invention can be converted to the corresponding salt using a first base, and some or all of the remaining free carboxylic acid groups in the partially neutralized polymer can be reacted with a second base and even with a third or fourth base so as to produce mixed salts of the polymers of the invention.

In general the molecular weight of the radiation-sensitive polymers of the invention will be within the range of about 20,000 to about 2,000,000. Said polymers are, for the most part, resinous solids which are soluble, in the form of the free carboxylic acid, in polar solvents such as acetone, methyl ethyl ketone, tetrahydrofuran, dioxane and the like, from which they can be cast as films as will be described in more detail hereinafter.

The maleic anhydride copolymers having the recurring unit (III) which are employed as starting materials in the process of the invention are well-known in the art; see, for example, Encyclopedia of Chemical Technology, edited by Kirk-Othmer, Interscience, New York, N.Y., vol. 8, pp. 685 et seq. and vol. 11, p. 652; U.S. Pats. 2,424,814 and 2,047,398. These copolymers can be obtained in a wide range of molecular weight, namely, from about 10,000 to about 1,250,000. As will be appreciated by one skilled in the art, the chain length of the starting maleic anhydride copolymer will remain unaffected by the conversion to the half ester polymer having recurring unit (I) although the overall molecular weight of the polymer will increase according to the number of anhydride moieties in the starting copolymer which are converted to half-ester moieties (I).

The alcohols (IV), which are employed as starting materials in preparing the radiation-sensitive polymers (I) of the invention, are readily prepared by reacting the appropriate diol HO—A—OH, wherein A has the significance hereinbefore defined, with appropriate isocyanatobenzenesulfonyl chloride of formula:

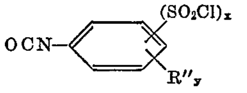

(IV)

wherein R″, $x$ and $y$ have the significance hereinbefore defined, followed by reaction with sodium azide. The reaction is carried out as described in detail in U.S. Pat. 3,652,599.

The alcohols (V) which are employed as starting materials in preparing the hydrophobic radiation-sensitive polymers of the invention are well known in the art as are the various methods for their preparation.

The hydrophobic radiation-sensitive polymers of the invention are useful for all the purposes described in the aforesaid copending application Ser. No. 93,446 and in copending application Ser. No. 246,855 filed Apr. 21, 1972 i.e. for chemically bonding dyestuffs (including basic, acid and direct dyestuffs) to substrates such as polyethylene, polypropylene, and the like which are not normally receptive to such dyestuffs, and in the preparation of photoresists especially for printing of microcircuitry and the like and in the photographic reproduction and printing arts. It is in the photoresist area that the hydrophobic radiation-sensitive polymers of the invention exhibit marked advantages over the related polymers described in the aforesaid copending applications. For example, the polymers of the invention can be used in the photographic reproduction and printing arts to produce printed masters as follows. The polymer is dissolved in a polar organic solvent, such as those exemplified above, and the solution is cast as a film on an appropriate substrate such as paper, metal and like film supports normally employed in the reproduction art. A negative of the image to be reproduced, e.g. lined, screened or half-tone negatives, or diapositives, is interposed between the supported film so obtained and a source capable of producing radiation necessary to activate the radiation-sensitive polymer. A wide variety of sources of thermal and/or actinic radiation can be employed. Such sources include carbon arcs, mercury vapor lamps, fluorescent lamps, argon glow lamps, photographic flood lamps, and tungsten lamps. Preferably the source of radiation is one which generates ultraviolet light of wavelength within the range of about 250 nm. to about 390 nm.

The polymer in those portions of the supported film which are exposed to the radiation as described above, is thereby bonded to the substrate. The polymer in the unexposed portions of the film can then be removed by washing with a polar organic solvent such as those described above, thereby "developing" a positive image corresponding to the negative used in the irradiation step. Such image not only has high resistance to deterioration by solvents, mechanical stresses, abrasion and the like but, unlike the images produced from the polymers described in the aforesaid copending applications, the image produced from the polymers of the invention is hydrophobic. Accordingly, the image is receptive to oleophilic inks. Further, the frequent immersion of the image and supporting substrate (usually aluminum) in water, which is a feature of lithographic operations, does not cause any problem since the surface of the image is not wetted by the water.

Similarly, photoresist systems produced from the radiation-sensitive polymers of the invention show marked advantages when used in other photoresist applications such as in the printing of microcircuitry, preparation of printing masters, and the like. In such application the image is printed on and bonded to a sheet of copper, zinc or like metal, using the same techniques for irradiation and development described above. The uncoated metal is then removed partially or entirely by etching using nitric acid or the like. It has been found that the polymers of the invention are markedly less susceptible to degradation by etching acids employed in the above procedure than are the polymers described in the aforesaid copending applications.

In any of the irradiation processes described above in which the radiation-sensitive polymers of the invention are bonded to substrates by exposure to appropriate radiation, there can be employed a sensitizer. The latter can be any of the sensitizers known in the art as useful in enhancing the sensitivity to radiation of azido and sulfonazido groups. Illustrative of such sensitizers are aromatic ketones such as Michler's ketone, dimethylaminobenzaldehyde, 4-methoxyacetophenone, 2-methoxyxanthone, N-phenylthioacridone, 1,2 - benzanthraquinone, 1,8-phthaloylnaphthalene, α-naphthoquinone and the like, pyrene, acridine, the pyrylium, thiopyrylium and selenopyrylium dye salts disclosed in U.S. 3,475,176; and the various heterocyclic sensitizers listed in U.S. Pats. 3,528,812, 3,528,813, and 3,528,814.

A particularly preferred form of sensitizer for use with the polymers of this invention is a built-in sensitizer which can be derived by introducing certain stilbene moieties into the chain of the radiation-sensitive polymers of the invention. This can be achieved by reacting the starting copolymer having recurring unit (III) with a third alcohol in addition to alcohol (IV) alone or in combination with alcohol (V). The reaction involving the various alcohols can be carried out simultaneously or sequentially as previously described. The third alcohol in question is one having the formula:

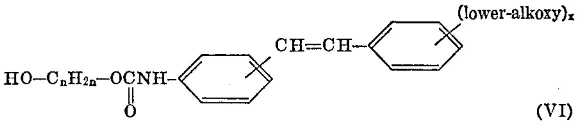

(VI)

wherein lower-alkoxy is as hereinbefore defined, $x$ is an integer from 1 to 3 and $C_nH_{2n}$ represents alkylene having from 2 to 6 carbon atoms separating the valencies and a total carbon atoms content of from 2 to 10.

The stilbene Compounds VI and processes for their preparation are described in copending application Ser. No. 180,203 filed Sept. 13, 1971. The reaction of the stilbene Compound VI with an anhydride moiety in a recurring unit (III) of the starting copolymer results in opening of the anhydride ring with simultaneous formation of a free carboxy group and an esterified carboxy group. As was explained in the corresponding reaction of alcohols (IV) and (V) the opening of the anhydride ring can give rise to two possible isomers and both isomers and mixtures thereof are within the scope of this invention. The proportion of stilbene moieties which are introduced into the radiation-sensitive polymers of the invention in this way is advantageously from about 5 to about 33 such stilbene moieties per 100 units corresponding to the Formula I in the radiation-sensitive polymers of the invention.

A particularly preferred group of radiation-sensitive polymers of the invention are those in which the alkylene group A in the esterified side chain of the recurring unit of Formula I is a straight chain alkylene which contains from 12 to 20 carbon atoms. The radiation-sensitive polymers within this preferred group give rise to cross-linked polymers characterized by outstanding hydrophobicity and are of particular value in the lithographic and microcircuitry applications described above.

The following preparation and examples described the manner and process of making and using the invention and set forth the best mode contemplated by the inventors of carrying out the invention but are not to be construed as limiting.

PREPARATION 1.—12-HYDROXYDODECYL 4-AZIDOSULFONYLCARBANILATE

To a solution of 12.1 g. (0.06 mole) of 1,12-dodecanediol in 150 ml. of chloroform was added, dropwise over a period of 6 hours with stirring, a solution of 3.3 g. (0.015 mole) of 4-isocyanatobenzenesulfonyl chloride in 50 ml. of acetonitrile. After the addition was complete a total of 1.1 g. (0.015 mole) of sodium azide was added and the resulting mixture was stirred for a period of 90 minutes at circa 45° C. Thereafter the mixture was stirred overnight at ambient temperature (circa 20° C.). The resulting mixture was filtered, the filtrate was maintained at circa 0° C. for 1 hour and again filtered. The filtrate from the second filtration was evaporated to dryness. The residue was dissolved in circa 100 ml. of benzene and the solution was treated slowly with n-hexane until no further precipitation occurred. The solid which had separated was isolated by filtration and dried in vacuo. There was thus obtained 4.3 g. of 12-hydroxydodecyl 4-azidosulfonylcarbanilate in the form of a solid having a melting point of 88 to 91° C.

Similarly, using the above procedure but replacing 1,12-dodecanediol by 1,15-pentadecanediol,
1,17-heptadecanediol,
1,18-octadecandiol, or
1,20-eicosanediol, there are obtained 15-hydroxypentadecyl,
17-hydroxyheptadecyl,
18-hydroxyoctadecyl and
20-hydroxyeicosanyl 4-azidosulfonylcarbanilates, respectively.

Example 1

A mixture of 5.7 g. (0.02 mole) of 2-hydroxyethyl 4-azidosulfonylcarbanilate (U.S. Pat. 3,652,599) and 20 g. (0.02 mole) of 40% by weight solution in toluene of the copolymer of maleic anhydride and n-octadecyl vinyl ether [Gantrez AN-8194; molecular weight average=30,000] was dissolved in a mixture of 50 ml. of anhydrous methyl ethyl ketone and 2.9 ml. (0.02 mole) of triethylamine. The resulting mixture was stirred for 20 hours at ambient temperature (circa 20° C.). At the end of this time 1.7 ml. of concentrated hydrochloric acid was added and the resulting solution was extracted with water before being diluted with 300 ml. of methanol. The pink solid which separated was isolated by filtration and dried in vacuo. There was thus obtained 10.2 g. (73% theoretical yield) of a hydrophobic radiation-sensitive copolymer of maleic anhydride and n-octadecyl vinyl ether in which the recurring unit in the chain was a moiety represented by the formula:

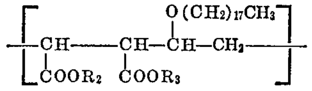

wherein one of $R_2$ and $R_3$ is hydrogen and the other is

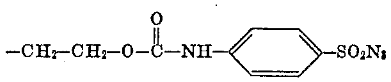

A solution of 5 g. of the radiation-sensitive polymer prepared as described above in 50 ml. of methyl ethyl ketone was used to case a film of average thickness 1 micron on a sheet of aluminum foil. On top of the film was placed a master representing a negative of a pattern of dots to be reproduced. The film, with master in place, was exposed for 15 seconds to the light emitted by a 200 watt high pressure mercury lamp, the exposure plane being at a distance of 1 meter from the mercury arc. The exposed film was developed by immersion in methyl ethyl ketone for 30 seconds. The aluminum foil, with the pattern of dots bonded thereto, was immersed in water and a roller coated with black lithographic ink (oil base) was rolled over the image. The ink adhered firmly to the pattern of dots and revealed the high resolution of the image.

In contrast an image of a pattern of dots, produced in exactly the same manner but using a radiation-sensitive polymer prepared by the procedure described above but replacing the copolymer of maleic anhydride and n-octadecyl vinyl ether by a copolymer of maleic anhydride and methyl vinyl ether (Gantrez AN-119), showed no affinity for the lithographic ink.

A printing plate was prepared from the hydrophobic radiation-sensitive polymer of the invention prepared as described above. A sheet of zinc (thickness 1.7 mm.) was coated with a film of average thickness 1 micron using a 10 percent by weight solution of the polymer in methyl ethyl ketone. The coated plate was covered with a negative of the photograph to be reproduced on the plate and the coated plate with negative in place was exposed for 15 seconds to the light emitted by a 200 watt high pressure mercury lamp, the exposure plane being at a distance of 1 meter from the mercury arc. The exposed film was developed by immersion in methyl ethyl ketone for 30 seconds. The zinc plate with the required image bonded thereto was then held in a vertical plane and sprayed with a 15 percent aqueous solution of nitric acid containing 3 percent of Jet-etch (sulfonated castor oil; etching additive; Revere) for 5 minutes. At the end of this time the plate was washed with water. It was found that the portions of the plate to which the cross-linked polymer had been bonded were completely untouched by acid whereas the depth of etching on the exposed portions of the plate was a uniform 80 microns. The image remaining on the plate showed high resolution and was suitable for use as a printing master.

In contrast, a plate which was prepared in exactly the same manner, but using a radiation-sensitive polymer prepared from a copolymer of maleic anhydride and methyl vinyl ether (Gantrez AN-119) in place of the copolymer of maleic anhydride and n-octadecyl vinyl ether, was not satisfactory. The acid used in the etching step penetrated the cross-linked polymer on this plate and produced etching beneath the polymer coating rendering the whole plate unsatisfactory.

Example 2

A solution of 2.1 g. (0.005 mole) of 12-hydroxydodecyl 4-azidosulfonylcarbanilate in a mixture of 25 ml. of methyl ethyl ketone and 10 ml. of toluene was treated slowly with stirring with a mixture of 25 ml. of methyl ethyl ketone and 10 g. (0.01 mole) of a 40 percent by weight solution in toluene of the copolymer of maleic anhydride and n-octadecyl vinyl ether [Gantrez AN-8194]. To the resulting mixture was added 0.73 ml. of triethylamine and the mixture was thereafter stirred for 20 hours at ambient temperature (circa 20° C.). At the end of this time 0.5 ml. of concentrated hydrochloric acid was added followed by a mixture of 350 ml. of methanol and 150 ml. of water. The precipitate which separated was isolated by filtration and dried in vacuo. There was thus obtained 4.5 g. of a solid, hydrophobic, radiation-sensitive copolymer of maleic anhydride and n-octadecyl vinyl ether in which 1 out of 2 of the recurring units in the chain was a moiety represented by the formula:

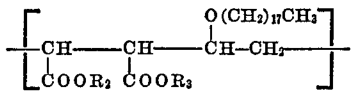

wherein one of $R_2$ and $R_3$ is hydrogen and the other is

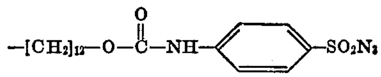

The remainder of the recurring units in said copolymer had the formula

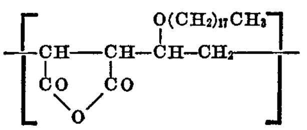

A film of the above polymer was cast on Mylar sheet using a 10 percent by weight solution of the polymer in a mixture of methyl ethyl ketone and toluene. The coated Mylar sheet was covered with a negative of a pattern of dots and exposed for 15 seconds to the light emitted by a 200 watt high pressure mercury lamp, the exposure plane being at a distance of 1 meter from the mercury arc. The exposed film was developed by immersion in methyl ethyl ketone for 30 seconds. The coated film, with pattern of dots bonded thereto was coated under water with back lithographic ink using a roller. The ink adhered well to the image and revealed the high resolution of the latter.

Example 3

Using the procedure described in Example 2, but replacing the 12-hydroxydodecyl 4-azidosulfonylcarbanilate by the equivalent amount of 15-hydroxypentadecyl 4-azidosulfonylcarbanilate, there was obtained a hydrophobic, radiation-sensitive polymer of the invention in which 1 out of 2 of the recurring units had the formula:

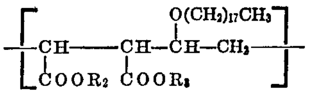

wherein one of $R_2$ and $R_3$ is hydrogen and the other is

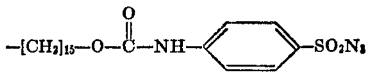

and the remainder of the recurring units in the polymer had the formula:

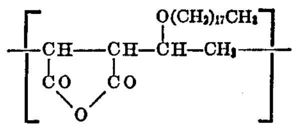

Similarly using the procedure described in Example 2, but replacing the 12-hydroxydodecyl 4-azidosulfonylcarbanilate by the equivalent amount of 17-hydroxyheptadecyl, 18-hydroxyoctadecyl or 20-hydroxyeicosanyl 4-azidosulfonylcarbanilates, there were obtained other hydrophobic, radiation-sensitive polymers of the invention.

Example 4

Using the procedure described in Example 1, but replacing the copolymer of maleic anhydride and n-octadecyl vinyl ether by an equivalent amount of the copolymer of maleic anhydride and n-pentadecyl vinyl ether, there was obtained a hydrophobic, radiation-sensitive polymer having a recurring unit of the formula:

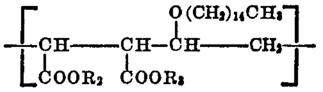

wherein one of $R_2$ and $R_3$ is hydrogen and the other is

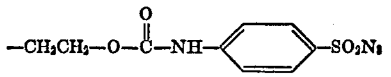

Similarly, using the procedure described in Example 1, but replacing the copolymer of maleic anhydride and n-octadecyl vinyl ether by equivalent amounts of the copolymers of maleic anhydride and n-dodecyl vinyl ether, n-pentadecyl vinyl ether or n-eicosanyl vinyl ether, there were obtained other hydrophobic, radiation-sensitive polymers of the invention.

Example 5

To a solution of 6.1 g. (0.01 mole) of the polymer, prepared as described in Example 2, in 50 ml. of methyl ethyl ketone was added a solution of 0.45 g. (0.005 mole) of N,N-dimethylethanolamine in 10 ml. of methyl ethyl ketone. The resulting mixture was stirred for 20 hours at ambient temperature (circa 20° C.) and then diluted with an equal portion of methanol. The solid which separated was isolated by filtration and dried in vacuo. There was thus obtained a hydrophobic, radiation-sensitive polymer of the invention in which 1 in 2 of the recurring units had the formula:

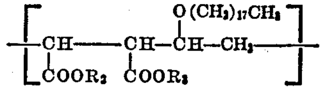

wherein one of $R_2$ and $R_3$ is hydrogen and the other is

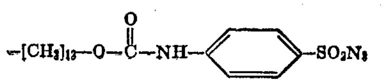

and the remainder of the recurring units have the formula:

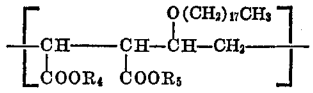

wherein one of $R_4$ and $R_5$ is hydrogen and the other is $$-CH_2CH_2N(CH_3)_2$$

Example 6

To a solution of 6.1 g. (0.01 mole) of the polymer, prepared as described in Example 2, in 50 ml. of methyl ethyl ketone, was added a solution of 1.75 g. (0.005 mole) of 2-hydroxyethyl trans-2,5-dimethoxystilbene-4'-carbamate in 50 ml. of methyl ethyl ketone. After the addition was complete the reaction mixture was allowed to stand overnight before being diluted with methanol. The solid which separated was isolated by filtration and dried in vacuo.

There was thus obtained a solid photosensitive polymer with built-in sensitizer in which approximately 1 out of 2 of the recurring units had the formula:

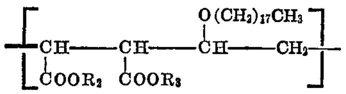

wherein one of $R_2$ and $R_3$ is hydrogen and the other is

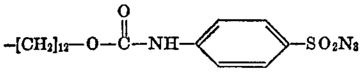

and the remainder of the recurring units had the formula:

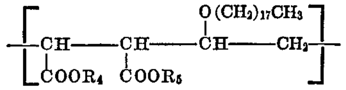

wherein one of $R_4$ and $R_5$ is hydrogen and the other is

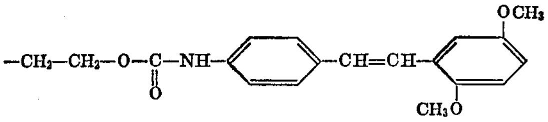

We claim:

1. A hydrophobic radiation-sensitive film-forming polymer characterized by the recurring unit:

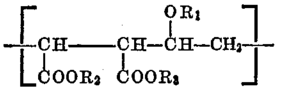

wherein $R_1$ is straight chain alkyl from 10 to 20 carbon atoms, inclusive, and wherein one of $R_2$ and $R_3$ represents hydrogen and the other of $R_2$ and $R_3$ represents a group having the formula:

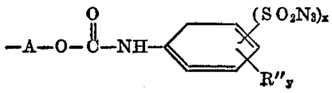

wherein A is alkylene having from 2 to 20 carbon atoms, inclusive, R" is selected from the class consisting of lower-alkyl and halogen, $x$ is an integer from 1 to 2, $y$ is an integer from 0 to 2, provided that $x+y$ is not greater than 3, and the $SO_2N_3$ group is in any of positions 3, 4 and 5 in the phenyl nucleus to which it is attached, and at least one of the said positions 3, 4 and 5 is unsubstituted.

2. A hydrophobic radiation-sensitive polymer according to claim 1 wherein the radical A in the recurring unit is straight chain alkylene of from 12 to 20 carbon atoms, inclusive.

3. A hydrophobic radiation-sensitive polymer according to claim 1 wherein the group $R_1$ in the recurring unit is octadecyl, one of the groups $R_2$ and $R_3$ represents hydrogen and the other represents:

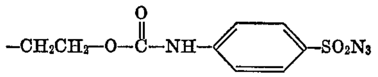

4. A hydrophobic radiation-sensitive polymer according to claim 1 wherein the group $R_1$ in the recurring unit is octadecyl, one of the groups $R_2$ and $R_3$ is hydrogen and the other represents:

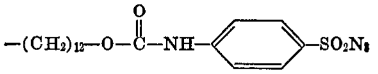

5. A hydrophobic radiation-sensitive polymer according to claim 1 which, in addition to the recurring unit defined in claim 1, also contains a recurring unit of the formula:

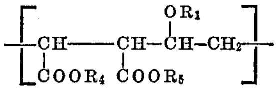

wherein $R_1$ is as defined in claim 1, one of $R_4$ and $R_5$ represents hydrogen and the other represents di(lower-alkyl)-aminohydrocarbyl.

6. A hydrophobic radiation-sensitive polymer according to claim 5 wherein $R_1$ in said recurring unit is octadecyl, one of $R_4$ and $R_5$ is hydrogen and the other is dimethylaminoethyl.

References Cited

UNITED STATES PATENTS

| | | | |
|---|---|---|---|
| 3,657,199 | 4/1972 | Sayigh et al. | 260—78.5 T |
| 3,652,599 | 3/1972 | Sayigh et al. | 260—349 |
| 3,699,080 | 10/1972 | Sayigh et al. | 260—47 CZ |

JAMES SEIDLECK, Primary Examiner

J. KIGHT, Assistant Examiner

U.S. Cl. X.R.

96—35.1, 91 N, 115 P; 117—93.31, 138.8 A; 204—159.14; 260—47 CZ, 49

UNITED STATES PATENT OFFICE
CERTIFICATE OF CORRECTION

Patent No. 3,794,626 Dated February 26, 1974

Inventor(s) Henri Ulrich, Fred A. Stuber and Allen J. Broggi

It is certified that error appears in the above-identified patent and that said Letters Patent are hereby corrected as shown below:

Column 11, line 14: Should read:

The acid — The nitric acid

Claim 1, Column 13, lines 55 and 56: Should read:

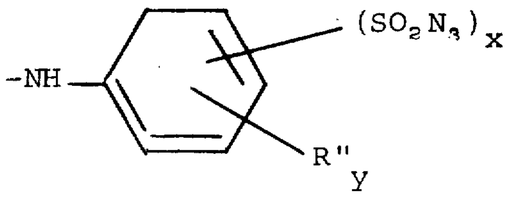

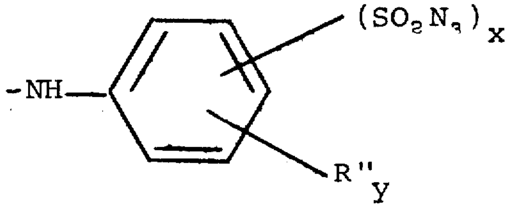

Signed and sealed this 22nd day of October 1974.

(SEAL)
Attest:

McCOY M. GIBSON JR.
Attesting Officer

C. MARSHALL DANN
Commissioner of Patents